United States Patent Office 3,850,892
Patented Nov. 26, 1974

3,850,892
PHYSIOLOGICALLY COMPATIBLE PLASTIC CONTACT LENSES AND A METHOD FOR THEIR PRODUCTION
Mitchel Shen, Kensington, Robert B. Mandell, Moraga, and Lawrence Stark, Berkeley, Calif. assignors to Biocontacts, Inc.
No Drawing. Continuation-in-part of abandoned application Ser. No. 215,137, Jan. 3, 1972. This application Nov. 30, 1972, Ser. No. 310,865
Int. Cl. C08f 27/12
U.S. Cl. 260—80.72     8 Claims

ABSTRACT OF THE DISCLOSURE

A process for reducing the glass transition temperature of a solid, formed, cross-linked, carbon-carbon backbone polymer having pendant carboxyl groups or lower alkyl ester carboxyl groups by esterifying the alkyl groups or by transesterifying the lower alkyl ester groups with groups having a greater number of carbon atoms.

BACKGROUND OF THE INVENTION

Field of the invention

This invention relates to a method for reducing the glass transition temperature of a hard, moderately cross-linked, olefin polymer and to the resulting composition. More particularly it relates to forming an article from a hard cross-linked olefin polymer and to converting it to a more flexible and relatively soft article by a novel esterification and/or transesterification of pendant carboxylic substituent groups of the hard polymer. Still more particularly it relates to forming a contact lens from a hard, moderately cross-linked, carbon-carbon, back-bone polymer and to converting the hard lens to a physiologically compatible lens by esterifying and/or transesterifying pendant carboxylic substituent groups of the hard polymer constituting the formed lens.

Cross-reference

This application is a continuation-in-part of our co-pending Application Ser. No. 215,137, filed Jan. 3, 1972, now abandoned.

Prior art

It is known in the art to fabricate contact lenses from rigid materials such as glass, clear plastics, particularly hard acrylic-type polymers, and the like. Such lenses are useful but have serious disadvantages. While the plastic lenses are safer than glass lenses to use and handle, they have had limited success because they are too hard and uncomfortable for the wearer. A proposed solution for the hardness of acrylic-type lenses has been the development of hydrophylic acrylic-type lens compositions, the so-called hydrogel acrylic-type polymers. While contact lenses fabricated from hydrogel polymers are indeed soft and in general are accommodated by the human eye with relatively little discomfort, they too suffer from serious disadvantages including:

(1) the hydrogel polymers accumulate (absorb) harmful compounds;

(2) the hydrogel-compound aggregates (substrates) favor growth of pathological organisms; and (3) the hydrogel lenses require special and inconvenient handling because of their poor structural strengths and high water contents.

Accordingly, there is a need for a composition suitable for use in the fabrication of substantially water-free, yet flexible, contact lenses which are comfortable for the wearer, strong, and convenient and safe to use.

THE INVENTION

A unique method or process for lowering the glass transition temperature (softening) of hard moderately cross-linked, carbon-carbon, back-bone polymers has now been found. Provided that these polymers contain at least about 10 weight percent (calculated as free carboxyl groups, —$CO_2H$) of pendant carboxylic substituent groups, they are effectively softened by a treatment which includes one or more chemical conversion reactions in which the pendant groups are esterified, directly or indirectly, and/or trans-esterified with a suitable alcohol. The substituent groups are carboxyl, lower alkyl carboxylate ester and carboxylic acid anhydride groups. The polymer may contain one or more kinds of these substituents.

By a hard polymer as used herein is meant by definition that the glass transition temperature of the polymer is sufficiently elevated to permit the fabrication from the polymer of an article, for example a contact lens, using conventional machining methods, i.e., in general, a temperature above 50° C.

The measurement of glass transition temperatures of plastic compositions is a well known determination. (See, for example, "Introduction to Polymeric Visco-elasticity," by J. J. Aklonis, W. J. MacKnight and M. Shen, John Wiley, New York (1972).)

By a moderately cross-linked polymer as used herein is meant that the polymer is mainly linear and that the precursor mixture used in the preparation of the polymer contained only sufficient of a cross-linking agent to yield a moderate degree of three dimensional stability to the polymer, i.e. a polymerization mixture which contains for each 100 mols of monomer and cross-linking agent from 0.1 to 10 mols of the cross-linking agent.

Carbon-carbon back-bone polymers are well known in the art [see "Organic Chemistry of Synthetic High Polymers," R. W. Lenz, Interscience Publishers, New York (1967)]. Briefly, these polymers are prepared by polymerizing mono-olefinic monomers and monomer mixtures. Provided no cross-linking agent is present in the monomer, long linear chains of carbon atoms are produced. When the olefinic functional group contains substituent groups, for example a carboxyl group as in acrylic acid, the linear chain of carbon atoms contains pendant carboxyl groups, hence the designation carbon-carbon back-bone polymer. For present purposes the carbon-carbon back-bone polymer must contain sufficient carboxylic substituent groups to permit the desired chemical and resulting physical modification obtained herein. In general, at least 10 weight percent of the polymer, calculated as free carboxyl groups, should be carboxylic constituents, preferably at least 20 weight percent. Surprisingly, and although the hard polymer precursors used herein are essentially insoluble in the suitable esterification reagents, alcohols, mixtures of alcohols and the like, the mass transfer of the agent into the solid moderately cross-linked polymer is facile and relatively rapid, making possible useful chemical conversions within reasonable reaction times.

In the present method a portion of the hard polymer, for example as a lens machined from a blank of the hard polymer, is immersed in a liquid medium and esterified, transesterified or both, or it is indirectly esterified. In general, except for the use of relatively longer reaction times, and the solid reactant, ordinary conditions are satisfactory.

The esterification is carried out by the direct reaction of the pendant carboxylic acid groups of the polymer with an alcohol:

(1) 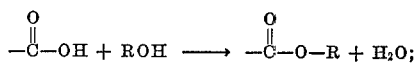

or by indirect esterification of the pendant carboxylic acid groups through the acid halide as represented:

(2) 

(3) —C—Cl + ROH ⟶ —C—O—R + HCl

The transesterification is an alcohol exchange reaction which may be represented as follows:

(4)
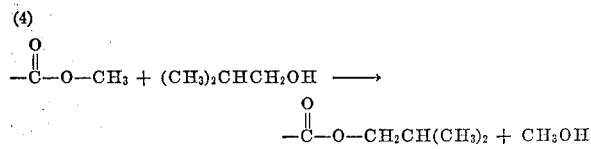

The resulting compositions, lenses, etc. are, in general, usefully flexible and physiologically compatible; for example, contact lenses prepared by the method of the invention cause little or no eye discomfort to most wearers. The novel polymer compositions obtained herein are substantially hydrophobic (absorb less than 1 weight percent of water at room temperature) and have glass transition temperatures below 20° C., usually below 0° C. The low degree of water absorption by the new polymeric compositions of the invention essentially precludes the prior art problems experienced and known in the art, particularly in the case of the polymeric hydrogel-type lenses.

EMBODIMENT

In a preferred embodiment, a hard polymer is prepared by polymerizing a mixture of acrylic acid, 2-methoxyethyl methacrylate, and 1,4-butanediol dimethacrylate. For each 100 moles of the mixture, there is desirably present 49.5 moles of acrylic acid, 49.5 moles of 2-methoxyethyl methacrylate and 1 mole of the 1,4-butanediol ester. The polymerization is effected by means of broad-band ultraviolet irradiation and is promoted by the addition of about 0.1 weight percent (based upon the mixture) of benzoin, a photoinitiator. For the polymerization, the mixture is placed in a shallow vessel, preferably one having conventionally treated interior surfaces for easy removal of an acrylic polymer. The vessel is filled to a depth of about one-fourth inch with the polymerization mixture. At room temperature and using the ultraviolet irradiation for the catalysis of the polymerization, the reaction is completed in about 12 hours. The product, a hard polymer, is a clear, inflexible vinyl-type back-bone polymer which contains pendant carboxyl and 2-methoxyethyl groups. This polymer has a glass transition temperature which is about 100° C.

In the next stage, the hard polymer is cut into a lens blank (button). The blank is shaped into a contact lens taking into account a dimensional change (preliminary measurements would indicate about a 5 percent increase) which takes place in the subsequent esterification treatment. In these operations ordinary plastic lens production techniques, as known in the art [see, for example, "Contact Lens Practice," Robert Mandell; C. Thomas; Springfield, Ill. (1965)], are used for machining, grinding, and polishing of the contact lens precursors. The resulting lens is a hard lens, a precursor lens suitable for conversion to a new and useful lens by the method of our invention.

Next, the precursor lens is immersed in a concentrated solution of phosphorus pentachloride in carbon disulfide and the solution is maintained at the reflux temperature for 20 hours. In this step the pendant carboxyl groups of the hard polymer are converted to acid chloride groups

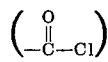

Finally, the acid chloride groups are converted to ester groups by removing the precursor lens from the carbon disulfide solution and immersing it in n-butyl alcohol which is maintained at the reflux temperature until the esterification (see equation 3 above) is completed, i.e. about 20 hours. The esterified polymer, the resulting lens, is then washed and extracted with water and dried; for example, in a vacuum oven maintained at 60° C. The dried lens is soft, clear and after sterilization in an autoclave is ready for use.

ALTERNATE EMBODIMENT

In an alternate method the glass transition temperature of the hard precursor lens is reduced to a satisfactory level by a direct esterification procedure. In this case the lens is immersed in a suitable acidified alcohol, for example n-butanol, which is maintained at the reflux temperature for about 10 hours, i.e. a period sufficient to esterify substantially all of the available free carboxyl groups. About a one weight percent (based upon the alcohol) portion of 85 percent sulfuric acid is a satisfactory amount of acid.

The treated lens is then removed from the n-butanol. It is washed to remove absorbed or occluded acid and alcohol and dried in a vacuum oven maintained at 60° C. The resulting lens has a satisfactory glass transition temperature and is ready for use.

The direct esterification treatment of the prepolymer appears in the main to involve the esterification of pendant carboxyl groups. However, it must be recognized that other reactions, including transesterification, etherification and interaction of pendant carboxyl and pendant 2-methoxyethyl groups of the prepolymer (internal transesterification), may also be taking place in some degree.

The hard precursor polymer

Pendant carboxylic acid groups and lower alcohol carboxylate ester groups impart hardness to a carbon-carbon, back-bone polymer, and they also provide the functional means through which the present inventive method operates to lower the glass transition temperature of the treated polymer. The relative amount of these hardness-imparting pendant groups desirably present varies depending upon the amount and kind of pendant higher alcohol carboxylate ester groups contained in the polymer. In general, and in terms of the polymerization mixture used in preparing the hard polymer, the mixture should contain at least about twenty mol percent of a carboxylic olefin monomer. An any event, hard, moderately cross-linked, carbon-carbon, back-bone polymers and their preparation are well-known in the art, and these compositons and their preparation are not of themselves a novel aspect of the present invention. As discussed above, the determination of glass transition temperatures of plastics is a routine determination. Accordingly, the use of hard, moderately cross-linked, carbon-carbon, back-bone polymers which contain at least 10 weight percent, calculated as free carboxyl groups, of pendant carboxylic substituent groups in general is contemplated herein, as is also similar hard polymers except that a minor amount (up to 20 percent) of the carbon atoms of the back-bone are replaced by oxygen, nitrogen, silicon and sulfur, preferably oxygen and nitrogen.

Preferably the hard polymer precursor is an acrylic-type polymer.

By an acrylic-type polymeric composition as used herein is meant a polymer obtained by a conventional polymerization of an acrylic-type acid (an olefin acid), an acrylic-type acid ester, an acrylic-type acid anhydride or a mixture of two or more of these monomers. Accordingly, the acrylic-type polymers herein contain pendant carboxyl groups, pendant carboxylate ester groups, pendant carboxylic acid anhydride groups or mixtures of two or more kinds of these groups.

Olefinic acids preferred as monomers for the preparation of hard polymers for use herein are of the general formula $(C=C)(CO_2H)_n(R)_{4-n}$ in which $n$ is 1 or 2 and when $n$ is 2 the carboxyl groups may be attached to the same or different carbon atoms of the carbon-carbon double bond, and R is hydrogen or an alkyl group having a carbon atom content of less than 6 and when $n$ is greater than 1 the R groups may be the same or different. When the olefinic acid is a monobasic acid, the preferred monomers are of the formula $$R^1R^2C=CR^3CO_2H$$

in which $R^1$ and $R^2$ are alkyl groups having a carbon atom content of less than 6 or hydrogen, more preferably $R^1$ and $R^2$ are the same or different and are of the group hydrogen, methyl and ethyl and $R^3$ is hydrogen or methyl. The corresponding carboxylic acid anhydrides may also be employed.

Representative olefinic acids useful in the preparation of satisfactory acrylic-type hard polymers include acrylic acid, methacrylic acid, 1-butenoic acid, isopentene-2-oic acid, 2,3-dimethylbutene-2-oic acid, 2-methylpentene-oic acid, tiglic acid, angelic acid, senecioic acid, maleic acid, itaconic acid, and the like olefinic acids. Acrylic acid is most preferred.

Acrylic-type ester monomers, that is the esters of the aforementioned olefinic acids, are in general useful in admixture with an olefinic acid component for the preparation of suitable hard polymers. Satisfactory hard polymers may also be produced when the acrylic-type monomer component is all or mainly methyl, ethyl acrylate-type acid ester or a mixed methyl and ethyl ester mixture. Preferred acrylic-type ester monomer components are of the formula $$R^1R^2C=CR^3CO_2Z$$

in which the groups $R^1$, $R^2$, and $R^3$ are as defined above, and in which Z is an alkyl group having a carbon atom content in the range from 1 to about 11, a hydroxyalkyl group having a carbon atom content in the range from 2 to about 11, or an alkoxyalkyl group having a carbon atom content in the range from 3 to about 11.

Representative acrylic-type ester monomers useful in the practice of the invention include methyl, ethyl, n-propyl, i-propyl, and the butyl acrylates and methacrylates; 2-hydroxyethyl acrylate and methacrylate, 2-hydroxypropyl acrylate and methacrylate, and especially the alkoxyalkyl acrylate and methacrylate esters where Z is of the formula $-CH_2CH_2OY$, $-CH_2CH(OY)CH_3$, $-CH_2CH_2CH_2OY$, $-CH(CH_3)CH_2OY$, or $$-CH_2CH_2CH_2CH_2OY$$

in which Y is an alkyl group having a carbon atom content in the range from 1 to about 7, and more particularly where Y has a carbon atom content in the range 1 to 3.

The dimensional and hardness requirements of the precursor polymers used herein are conveniently satisfied by defining the relative proportions and kinds of the reactants employed for the polymerization reaction mixture. The relationship between the dimensional stability factor and the amount of the cross-linking agent used has been considered above. Regarding the other reactants, the acrylic-type monomers, the composition of the mixture may vary widely provided at least 10 weight percent of the mixture is carboxyl groups substituents or the equivalent (i.e., lower alkyl carboxylate ester and/or olefinic acid anhydride groups).

Preferably the hard precursor polymer is prepared from a mixture of the acid and ester monomers and in which the polymer, an acrylic-type polymer, contains the following components based upon 100 mols of the polymerization reaction mixture:

(1) an amount of an acrylic-type acid in the range from 20 to 90 mols, more preferably 50 to 75 mols;
(2) an amount of an acrylic-type ester in the range from 10 to 75 mols, more preferably 25 to 50 mols; and
(3) an amount of a divinyl cross-linking agent in the range from about 0.1 to 10 mols, more preferably 1 to 3 mols.

Where the acid component of the hard polymer is acrylic, methacylic, or a mixture of these acids and the ester component is an alkoxyalkyl acrylate or methacrylate the method herein usually results in the preparation of superior contact lenses.

Cross-linking agent

The polymerization mixture must contain some cross-linking agent. Otherwise the prepolymer and the treated prepolymer will not have a satisfactory dimensional stability. On the other hand, if it contains too much of the agent, the resulting polymer cannot be converted to a flexible and physiologically compatible composition by the method of the invention. For each 100 mols of the polymerizable components of the polymerization mixture, at least about 0.1 mole of a divinyl cross-linking agent is required. Usually a satisfactory hard polymer precursor is obtained when the relative amount of the agent is in the range from 0.1 to 10, preferably 1 to 3, mols per 100 mols of the mixture.

Organic divinyl cross-linking agents in general as known in the olefin polymerization art are satisfactory for use in the method of the invention and are contemplated for use herein. The general formula for those agents of particular usefulness is $(H_2C=CH)_2Q$, where Q may be oxygen, or a divalent organic radical composed of carbon and hydrogen, or of carbon, hydrogen, and oxygen. In general, satisfactory linking agents have a molecular weight in the range from 70 to 400 units.

Representative cross-linking agents useful in the practice of the invention include compounds of the classes:

(1) Divinyl esters of organic dicarboxylic acids such as oxalic, terephthalic, hexahydroterephthalic, malonic, succinic, and the like acids;

(2) Divinyl-type ethers such as divinyl ether, alkyl ether,, dibut-3-enyl ether, dipent-4-enyl ether, and the like ethers;

(3) Divinyl hydrocarbons (alpha-omega diolefinic hydrocarbons) such as divinyl benzene, divinyl toluene, 1,4-pentadiene, 1,5-hexadiene, and the like hydrocarbons containing two vinyl, i.e., $(CH_2=CH)-$, groups (4) Aliphatic diol (glycol-type) esters of the acrylic-type acids of the group of acids formulated above such as esters of the formula $$CH_2=CH_2CO_2(CH_2CH_2O)_nCH_2CH_2O_2CCH=CH_2$$

where $n$ is a number in the range 0 to 3, inclusive: 1,4-cyclohexanediol diacrylate and dimethacrylate, and corresponding esters of 1,3-propanediol, 1,2-propanediol, 1,4-butanediol, ethylene glycol, and the like esters of acrylic-type carboxylic acids. The glycol-type acrylate and methacrylate ester cross-linking agents are preferred.

Representative polymerization conditions include: (1) the use of a suitable catalyst (an organic or inorganic peroxide or actinic light, or X-rays or electron bombardment and the like): (2) the use of heat and sufficient pressure to maintain the reactants in the liquid phase; and (3) the use of sufficient reaction time to provide for a substantially complete polymerization of the mix. A preferred method for use herein is the ultra-violet catalyzed polymerization carried out at the ambient temperature.

The esterification or transesterification alcohol reagent

The alcohols satisfactory for use herein vary depending whether the treatment is an esterification or a transesterification. For the esterification of carboxylic acid groups, even ethanol is beneficial with respect to the lowering of the glass transition temperature. Preferably the alcohol has a carbon atom content of at least three for a direct esterification. In the case where all or part of the desired softening effect involves a transesterification, the higher alcohol (the replacing alcohol) should, in general, have a carbon atom content superior by at least 2 to that of the replaced alcohol. Thus, in general, a satisfactory alcohol will have an alcohol content in the range from 1 to 15 and exhibits a useful penetration into the interior of the hard polymers described above. Preferably, the carbon atom content of the alcohol will be less than about 12. The alcohol may be a monatomic, diatomic, or methoxy-, ethoxy- or propoxy monatomic alcohol. A single alcohol or a mixture of alcohols may be used as reactants for the esterification or transesterification.

More satisfactory results usually are experienced when the treated hard polymer, i.e. the final product, contains less than about seventy-five mole percent of alkoxyalkyl and hydroxyalkyl ester groups. The relative amount of the hydroxyalkyl and alkoxyalkyl ester groups of the treated polymer should be in the range of 10 to 75, preferably from 25 to 50 mole percent, of the total of the pendant ester groups.

The alcohols used for the esterification or transesterification treatments may contain primary, secondary or tertiary hydroxyl groups. Best results, in general, appear to be obtained from the use of monatomic primary alcohols having a carbon atom content in the range from 1 to about 7, preferably 3 to 7.

A preferred class of alcohols contemplated for use in the invention may be represented by the formula ZOH in which Z is:

(1) A hydrocarbon radical having a carbon atom content in the range from 1 to 11; or (2) A radical of the formula —$CH_2CH_2OY$,

—$CH_2CH(OY)CH_3$, —$CH_2CH_2CH_2OY$,
—$CH(CH_3)CH_2OY$, —$CH_2CH_2CH_2CH_2OY$, or the like in which Y is an alkyl group having a carbon atom content in the range from 1 to about 7, more preferably 1 to 3. The aforementioned hydrocarbon radicals should be free of olefinic and acetylenic carbon-carbon unsaturation, i.e. saturated hydrocarbon radicals. Depending upon the carbon atom content, satisfactory hydrocarbon radicals may be alkyl, cycloalkyl aralkyl, alkylcycloalkyl or cycloalkylalkyl groups and the alkyl portions may be of the straight or branched chain moiety. Preferably the hydrocarbon radical is an alkyl group.

Representative alcohols (esterification or transesterification agents) useful in the practice of the invention include methanol, ethanol, n-propanol, i-propanol, n-butanol, s-butanol, t-butanol, pentanol-2, n-pentanol, n-hexanol-, heptanol-2, octanol, nonanol, decanol, and the like alkanols, especially those alkanols having a carbon atom content below 8; also included are cyclohexanol, benzyl alcohol, hexahydrobenzyl alcohol, 1,4-cyclohexanediol, cyclopentanol, 2-methylcyclopentanol and the like cyclic alcohols; 2-methoxyethanol, 2-methoxypropanol-1, 2-ethoxyethanol, 2-(n-propoxy)ethanol, 3-(n-propoxy)-n-propanol, 3-methoxy-n-butanol, 4-(n-propoxy)-m-butanol, 4-ethoxy-n-butanol and the like alkoxy alkanols; glycol, 1,4-butanediol, 1,3-propanediol, 1,2-dihydroxybutane, 1,3-dihydroxybutane, and the like diatomic alcohols. n-Propanol and n-butanol are preferred alcohol esterification agents.

Treating conditions

The esterification and/or transesterification reactions by which the hard precursor polymers are beneficiated are, in general, carried out in a manner analogous to ordinary esterifications or transesterifications of a representative carboxylic acid, for example, propionic acid in homogeneous reaction systems as known in the art except that suitable reaction times may be somewhat longer duration, for example, a reaction of from 10 to 500 percent longer.

Direct esterification conditions

A wide range of temperatures are suitable for directly carrying out the present treatment with an esterification agent. In general, a satisfactory temperature will be in the range from about 10° C. to 200° C. Since the agent must be in the liquid phase, a pressure sufficient to maintain the liquid phase is required when the temperature used is in the upper range of the useful temperatures.

In general, the time required for a satisfactory conversion of the hard polymer depends upon the temperature employed, upon the particular alcohol agent used, and upon the presence or absence of an esterification catalyst in the mix. Usually the time required will be in the range from about 1 to 100 hours, with the shorter times corresponding to the use of an upper temperature of the range.

The esterification proceeds in the absence of a catalyst under the ordinary thermal esterification conditions as known in the art, for example, at a temperature above about 10° C. and below about 200° C. Preferably, an esterification catalyst which is soluble in the alcohol agent is employed. In general, esterification catalysts as known in the art for their usefulness in the catalysis of alkanol-carboxylic acid esterification reactions are also useful in the present method. Because of its general solubility in the agents contemplated herein and because of the relative ease of its removal from the treated polymer, concentrated sulfuric acid is a preferred catalyst. Usually a reaction time in the range 4 to 20 hours is satisfactory when sulfuric acid is used to catalyze the desired conversion.

The amount of the agent and catalyst desirably used varies widely. In general sufficient of the alcohol agent for complete immersion of the hard precursor polymer should be used. Based upon the weight of the alcohol agent used, pursuant to ordinary esterification practice, an effective amount of the esterification catalyst is in the range from about 0.2 to 5 weight percent.

Indirect esterification conditions

A. Conversion of pendant carboxyl groups to acid halide groups.—Pendant carboxyl groups have been found to be conveniently converted to acid halide groups by the usual acid-halide-forming reactions as known in the art. Since the hard precursor polymer is insoluble in the liquid reaction medium (i.e. the halogenating agent per se in the liquid form or the agent dissolved in an inert solvent), the reaction times are somewhat larger than for conventional conversions. The time required also varies depending upon the relative thickness of the article, for example a lens, and the temperature used. In general, suitable reaction times are on the range from about 0.5 to 100 hours, and usually are in the range from 5 to 25 hours. The inert solvents ordinarily used in conventional acid-chloride-forming reactions, such as carbon disulfide, carbon tetrachloride, alkyl ethers, hydrocarbon mixtures, and the like, are satisfactory for use herein as are likewise the temperatures normally employed for the conversion of a carboxyl group to an acid halide group. These vary depending upon the particular reagent, the solvent and the pressure and are ordinarily in the range 10° C. to 200° C.

A wide range of inorganic acid-halide-forming reagents are useful herein, including phosphorus penta- and trichloride, $POCl_3$, thionyl chloride, sulfuryl chloride, and the like reagents. The corresponding bromine-containing reagents are also useful reagents, but of course are more costly and usually less conveniently employed. Phorphorus pentachloride and thionyl chloride are preferred for use herein.

B. Conversion of pendant acid halide groups to ester groups.—The esterification of a hard polymer containing pendant acid halide groups is carried out by immersing the polymer in a suitable alcohol and maintaining the alcohol at a temperature in the range from about 10° C. to 200° C. and at a pressure sufficient to maintain the alcohol in a liquid phase for a period sufficient for a substantially (95% plus) complete conversion of the acid halide (—COCl) groups to ester groups (—$CO_2R$). Depending upon the temperature, a satisfactory reaction time will be in the range from 0.5–100 hours.

When the esterification is completed, the esterified polymer is removed from the medium, washed free of the liberated halogen acid and is freed of absorbed or occluded alcohol by washing with water and drying.

C. Transesterification.—In the preferred transesterification aspect of the present method pendant lower alkyl (usually methyl or ethyl) carboxylate ester groups are converted to suitable higher alkyl ester groups in an acid catalyzed displacement on carboxylate carbon. A lower boiling alcohol is displaced from the ester group by a higher boiling alcohol, and the reaction is driven to completion by separating the lower alcohol from the higher alcohol by distillation. The hard lens is immersed in the higher alcohol at the reflux temperature in the presence of a mineral acid catalyst. The conversion is complete when little or no additional lower boiling alcohol can be distilled from the reaction medium. In general for a satisfactory reduction in the glass transition temperature of the hard polymer, the higher boiling alcohol should have a carbon atom content which exceeds that of the lower boiling alcohol by an amount in the range from 2 to 9 carbon atoms. As in the case of a direct esterification, a strong mineral acid, such sulfuric acid, is desirably used and in the same relative amounts. Accordingly, a hard polymer which contains pendant carboxyl groups ($-CO_2H$) and pendant lower alkyl ester groups ($-CO_2R$) is conveniently converted to a product having a reduced and satisfactory glass transition temperature by a combination of a direct esterification reaction and of a transesterification reaction.

The following representative examples further illustrate the invention. In each case the polymerization mixture was maintained at a temperature of about 25° C. The reaction was catalyzed by irradiation of the mixture with broadband ultraviolet light until the reaction was essentially completed, i.e. in the range from 4 to 12 hours. About 0.1 weight percent of benzoin was included in the mixture in order to improve the efficiency of the catalyst. The cross-linking agent was 1,4-butanediol dimethacrylate which was added to the polymerization mixture in the ratio of 1 mole per 99 moles of the acrylic-type monomer(s) employed. The resulting acrylic-type prepolymers were, in general, hard and inflexible solids.

Using standard lens fabrication methods a lens blank was cut and a lens shaped from a portion of the product from each example. The shaped lens was then immersed in a suitable alcohol as noted in the Table below together with about 0.5 grams of sulfuric acid per 100 grams of the alcohol. The acidified alcohol and lens was then maintained at the temperature and for the period also as noted in the Table. In examples 1–8 acrylic acid (AA) or acrylic acid and 2-methoxyethyl methacrylate (MEMA) were used. After the treated lens was removed from the alcohol, it was washed and oven dried at 60° C. with the following comparative results.

EXAMPLE 9

A mixture of acrylic-type monomers was polymerized using the ultraviolet light-benzoin catalyst system described above. The monomeric mixture had the composition:

| Component | Mol percent |
|---|---|
| n-Butyl methacrylate | 48 |
| Acrylic acid anhydride | 48 |
| Ethylene glycol dimethacrylate | 4 |
| | 100 |

The resulting hard acrylic-type polymer was cut, shaped and polished to form a contact lens. The lens was then immersed in isopentanol which was maintained at the reflux temperature for about 20 hours. The treated lens was removed from the alcohol, washed with water and dried. The resulting lens was soft (glass transition temperature below 0° C. and clear.

EXAMPLE 10

The preceding example was repeated except that n-butanol was used for the esterification reaction. The esterified lens was soft and clear.

EXAMPLES 11–17

Soft acrylic-type lenses were prepared by the indirect esterification procedure in which the acrylic monomer mixture was:

| Component | Mol percent |
|---|---|
| n-Butyl methacrylate | 48 |
| Acrylic acid | 48 |
| Ethylene glycol dimethacrylate | 4 |
| | 100 | and the polymerization was effected as in example 9. Acrylic-type lenses were prepared from the resulting hard acrylic-type polymer as before. The pendant carboxyl groups of the hard lenses were then converted to acid chloride groups by immersing the hard lenses in a refluxing solution of phosphorus pentachloride in carbon disulfide for a period of 20 hours. The treated lenses were then esterified by immersing them in the following alcohols and dried with the indicated results:

| Example No. | Alcohol | Remarks |
|---|---|---|
| 11 | N-propanol | Soft, clear; excellent lens. |
| 12 | Isopropanol | Do. |
| 13 | N-butanol | Do. |
| 14 | N-pentanol | Do. |
| 15 | Isopentanol | Do. |
| 16 | N-hexanol | Do. |
| 17 | N-octanol | Do. |

| Example No. | Acrylic-type components | Relative amount, moles | Alcohol | Esterification conditions Temp. °C. | Time, hrs. | Remarks |
|---|---|---|---|---|---|---|
| 1 | AA<br>MEMA | 1.0<br>0.0 | N-propanol | 90 | 6 | Soft lens, fair. |
| 2 | AA<br>MEMA | 0.75<br>0.25 | do | 90 | 6 | Soft lens, good. |
| 3 | AA<br>MEMA | 0.50<br>0.50 | do | 90 | 6 | Soft lens, very good. |
| 4 | AA<br>MEMA | 0.25<br>0.75 | do | 90 | 6 | Soft lens, fair. |
| 5 | AA<br>MEMA | 1.0<br>0.0 | Methoxyethanol | 125 | 4 | Do. |
| 6 | AA<br>MEMA | 0.75<br>0.25 | do | 125 | 4 | Soft lens, good. |
| 7 | AA<br>MEMA | 0.50<br>0.50 | do | 125 | 4 | Soft lens, excellent. |
| 8 | AA<br>MEMA | 0.25<br>0.75 | do | 125 | 4 | Soft lens, fair. |

EXAMPLES 18-20

An acrylic-type mixture of monomers and crosslinking agents as follows:

| Component | Mol percent |
|---|---|
| 2-hydroxyethyl methacrylate | 96 |
| Ethylene glycol dimethacrylate | 4 |
| | 100 | was polymerized in the manner described in example 9 and hard lenses were prepared as before. The hard lenses thus prepared were transesterified using a higher alcohol and an acid catalyst (1 weight percent sulfuric acid, based upon the alcohol). The lenses were immersed in the indicated alcohols at the reflux temperature with the results as noted:

| Example No. | Alcohol | Remarks |
|---|---|---|
| 18 | Isopropanol | Flexible and clear. |
| 19 | N-butanol | Do. |
| 20 | N-pentanol | Do. |

Similarly useful results are obtained in general when the hard polymer is prepared from acrylic-type monomers and mixtures thereof as described above. The resulting hard polymers (lenses) are effectively softened and rendered physiologically compatible, in general, by one or more treatments as described above.

The above examples demonstrate that moderately cross-linked acrylic-type hard polymers containing pendant carboxyl and/or ester groups are substantially improved by treating them under esterification and/or transesterification conditions with a suitable alcohol.

In addition to the foregoing examples, contact lenses have been made by the method herein in the form of corneal, semi-scleral and scleral lenses of various types as known in the art. In every case, the lenses had excellent properties including good flexibility, good physiological compatibility, and but a minor water equilibration value.

Obviously, many modifications and variations of the present method for the production of physiologically compatible plastic materials, contact lenses, biomaterials and the like, as well as gaskets, valves, seals and the like articles, are evident in view of the teachings given hereinabove including the addition of coloring materials as known in the art. It is therefore to be understood that, within the scope of the appended claims, the invention can be practiced otherwise than as specifically described.

We claim:

1. The process for lowering the glass transition temperature of a solid, cross-linked polymer obtained by polymerizing polymerizable components including at least one monomer selected from $$R^1R^2C=CR^3CO_2H \text{ and } R^1R^2C=CR^3CO_2Z$$

wherein $R^1$ and $R^2$ are the same or different, and they are either alkyl groups having a carbon atom content less than 6 or hydrogen; $R^3$ is hydrogen or methyl, and Z is an alkyl group having a carbon atom content from 1-11, a hydroxyalkyl group having a carbon atom content of from 2-11 or an alkoxyalkyl group having a carbon atom content from 3-11; said polymerizable components containing from about 0.1 to about 10 mols of cross-linking agent per 100 mols of polymerizable components and said polymer containing at least 10 weight percent, calculated as free carboxyl groups, of pendant carboxylic substituent groups, said substituent groups being selected from the group consisting of carboxyl, alkyl carboxylate ester having from 1-11 carbon atoms, carboxylic acid anhydride groups and mixtures thereof which comprises treating the resultant solid, cross-linked polymer by one or more chemical conversion reactions of the group:

(a) direct esterification of said pendant carboxyl and carboxylic acid anhydride groups by contacting the solid polymer with an alcohol having from 1-15 carbon atoms for a time sufficient and under conditions to effect esterification;

(b) indirect esterification of said carboxyl and carboxylic acid anhydride groups by contacting said carboxyl and carboxylic acid anhydride groups with an acid halide forming reagent under reaction conditions and subsequently contacting the resultant acid halide groups with an alcohol having from 1 to 15 carbon atoms at reaction conditions; and (c) transesterifying said alkyl carboxylate ester groups to higher alkyl carboxylate groups by contacting said polymer with an alcohol having from 2-15 carbon atoms and a greater number of carbon atoms than said alkyl carboxylate ester group at reaction conditions.

2. The method for the production of a contact lens which comprises:

(a) forming said lens from a hard, solid, cross-linked polymer obtained by polymerizing polymerizable components including at least one monomer selected from $$R^1R^2C=CR^3CO_2H \text{ and } R^1R^2C=CR^3CO_2Z$$

wherein $R^1$ and $R^2$ are the same or different, and they are either hydrogen or are alkyl groups having a carbon atom content less than 6; $R^3$ is hydrogen or methyl, and Z is an alkyl group having a carbon atom content from 1-11, a hydroxyalkyl group having a carbon atom content of from 2-11 or an alkoxyalkyl group having a carbon atom content from 3-11; said polymerizable components containing from about 0.1 to about 10 mols of cross-linking agent per 100 mols of polymerizable components and said polymer containing at least 10 weight percent, calculated as free carboxyl groups, of pendant carboxylic substituent groups, said substituent groups being selected from the group consisting of carboxyl, alkyl carboxylate ester having from 1-11 carbon atoms, carboxylic acid anhydride groups and mixtures thereof; and (b) lowering the glass transition temperature of the formed lens by treating the resultant hard, solid, cross-linked polymer by one or more chemical conversion reactions of the group:

(i) direct esterification of said pendant carboxyl and carboxylic acid anhydride groups by contacting the solid polymer with an alcohol having from 1-15 carbon atoms for a time sufficient and under conditions to effect esterification;

(ii) indirect esterification of said carboxyl and carboxylic acid anhydride groups by contacting said carboxyl and carboxylic acid anhydride groups with an acid halide forming reagent under reaction conditions and subsequently contacting the resultant acid halide groups with an alcohol having from 1 to 15 carbon atoms at reaction conditions; and (iii) transesterifying said alkyl carboxylate ester groups to higher alkyl carboxylate groups by contacting said polymer with an alcohol having from 2-15 carbon atoms and a greater number of carbon atoms than said alkyl carboxylate ester group at reaction conditions.

3. The method of claim 2 wherein a hard polymer with a glass transition temperature above 50° C. is treated by any one of said chemical conversion reactions until the glass transition temperature is lowered to below about 20° C.

4. The method of claim 3 wherein the glass transition temperature is lowered to below about 0° C.

5. The method as in claim 2 wherein the glass transition temperature is lowered by direct esterification by reacting the pendant carboxyl groups of the hard polymer of the formed lens with one or more monatomic or diatomic alcohols having a carbon atom content which is less than 16 by immersing the formed lens in said alcohol in the liquid phase and maintaining the immersed lens and alcohol at a temperature in the range from about 10° C. to 200° C. and at a pressure sufficient to maintain said liquid phase, said temperature being maintained for a period in the range from about 1 to 100 hours and sufficient to complete the reduction of the glass transition temperature.

6. The method as in claim 5 wherein said esterification is catalyzed by a strong mineral acid.

7. The method as in claim 5 wherein said monatomic alcohol has a carbon atom content in the range from 3 to 7.

8. The method as in claim 2 wherein the glass transition temperature is lowered by indirect esterification of the pendant carboxyl groups of the hard polymer by reacting the pendant carboxylic acid groups of the formed hard polymer lens with an inorganic carboxylic-acid-chloride forming reagent by immersing said lens in the reagent in the liquid phase at a temperature in the range from about 10° C. to 200° C. and at a pressure sufficient to maintain said liquid phase, said temperature being maintained for a period in the range from about 2 to 100 hours and sufficient to substantially complete said acid-chloride-forming reaction; removing the reagent-treated lens from the remaining liquid reagent and esterifying the resulting pendant carbacyl chloride groups by immersing said treated lens in an alcohol in the liquid phase at a temperature in the range from about 10° C. to 200° C. for a period in the range from about 0.5 to 100 hours, said alcohol having a carbon atom content in the range from 1 to about 15.

References Cited
UNITED STATES PATENTS

| | | | |
|---|---|---|---|
| 2,284,639 | 6/1942 | Coes | 260—84 |
| 2,983,696 | 5/1961 | Tocker | 260—23 |
| 3,503,942 | 10/1965 | Seiderman | 260—80.75 |
| 3,563,937 | 2/1971 | Nickerson | 260—33.4 |
| 3,575,946 | 4/1971 | Chromecek et al. | 260—86.1 |
| 3,607,848 | 9/1971 | Chromecek et al. | 260—86.1 |
| 3,699,089 | 10/1972 | Wichterle | 260—86.1 |
| 3,728,315 | 4/1973 | Gustafson | 260—80.75 |
| 2,492,169 | 12/1949 | Mast et al. | 260—79.5 |
| 3,676,410 | 7/1972 | Bauer et al. | 260—80.81 |
| 3,728,317 | 4/1973 | Blank | 260—86.1 R |

FOREIGN PATENTS

| | | |
|---|---|---|
| 523,463 | 4/1956 | Canada. |
| 669,753 | 9/1963 | Canada. |
| 669,931 | 9/1963 | Canada. |

STANFORD M. LEVIN, Primary Examiner

U.S. Cl. X.R.

260—78.5 I, 78.5 UA, 80.3 E, 80.3 R, 80.75, 80.76, 80.8, 80.81, 86.1 R, 86.1 E, 86.7; 351—160